(12) United States Patent
Falik et al.

(10) Patent No.: US 9,158,703 B2
(45) Date of Patent: *Oct. 13, 2015

(54) LINEAR TO PHYSICAL ADDRESS TRANSLATION WITH SUPPORT FOR PAGE ATTRIBUTES

(71) Applicant: Intel Corporation, Santa Clara, CA (US)

(72) Inventors: Ohad Falik, Kfar-Saba (IL); Ben-Zion Friedman, Jerusalem (IL); Jack Doweck, Haifa (IL); Eliezer Weissmann, Haifa (IL); James B. Crossland, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,669

(22) Filed: Jun. 23, 2014

(65) Prior Publication Data

US 2014/0304488 A1    Oct. 9, 2014

Related U.S. Application Data

(63) Continuation of application No. 11/757,103, filed on Jun. 1, 2007, now Pat. No. 8,799,620.

(51) Int. Cl.
*G06F 12/00* (2006.01)
*G06F 12/10* (2006.01)

(52) U.S. Cl.
CPC ........ *G06F 12/1009* (2013.01); *G06F 12/1027* (2013.01); *G06F 12/10* (2013.01); *G06F 12/1036* (2013.01); *G06F 2212/507* (2013.01); *G06F 2212/657* (2013.01)

(58) Field of Classification Search
CPC   G06F 12/1027; G06F 12/1036; G06F 12/109
See application file for complete search history.

(56) References Cited

U.S. PATENT DOCUMENTS

| 4,363,095 | A | 12/1982 | Woods et al. |
|---|---|---|---|
| 4,466,056 | A | 8/1984 | Tanahashi |
| 5,173,872 | A | 12/1992 | Crawford et al. |
| 5,754,818 | A | 5/1998 | Mohamed |

(Continued)

FOREIGN PATENT DOCUMENTS

| CN | 85106711 A | 2/1987 |
|---|---|---|
| CN | 1784663 A | 6/2006 |

(Continued)

OTHER PUBLICATIONS

Office Action received for United Kingdom Patent Application No. 0809264.5, mailed on Aug. 25, 2009, 2 pages.

(Continued)

*Primary Examiner* — Cheng-Yuan Tseng
*Assistant Examiner* — Arvind Talukdar
(74) *Attorney, Agent, or Firm* — Vecchia Patent Agent, LLC (57) ABSTRACT

Embodiments of the invention are generally directed to systems, methods, and apparatuses for linear to physical address translation with support for page attributes. In some embodiments, a system receives an instruction to translate a memory pointer to a physical memory address for a memory location. The system may return the physical memory address and one or more page attributes. Other embodiments are described and claimed.

13 Claims, 5 Drawing Sheets

(56) References Cited

U.S. PATENT DOCUMENTS

| | | | |
|---|---|---|---|
| 5,893,166 | A | 4/1999 | Frank |
| 5,918,251 | A | 6/1999 | Yamada et al. |
| 6,085,296 | A | 7/2000 | Karkhanis et al. |
| 6,105,113 | A | 8/2000 | Schimmel |
| 6,138,226 | A | 10/2000 | Yoshioka et al. |
| 6,260,131 | B1 | 7/2001 | Kikuta et al. |
| 6,289,432 | B1 | 9/2001 | Ault et al. |
| 6,351,797 | B1 * | 2/2002 | Beard et al. .................. 711/207 |
| 6,564,311 | B2 | 5/2003 | Kakeda et al. |
| 6,598,050 | B1 | 7/2003 | Bourekas |
| 6,651,156 | B1 | 11/2003 | Courtright et al. |
| 6,895,491 | B2 | 5/2005 | Kjos et al. |
| 7,302,546 | B2 | 11/2007 | Hsu et al. |
| 7,334,076 | B2 | 2/2008 | Hendel et al. |
| 7,363,463 | B2 | 4/2008 | Sheu et al. |
| 7,428,626 | B2 | 9/2008 | Vega |
| 2005/0154854 | A1 | 7/2005 | Hsu et al. |
| 2006/0020719 | A1 | 1/2006 | Martinez et al. |
| 2006/0036830 | A1 | 2/2006 | Dinechin et al. |
| 2006/0064567 | A1 | 3/2006 | Jacobson et al. |
| 2006/0143405 | A1 | 6/2006 | Ishikawa et al. |
| 2006/0206687 | A1 | 9/2006 | Vega |
| 2006/0224815 | A1 * | 10/2006 | Yamada et al. .................. 711/6 |
| 2007/0043908 | A1 | 2/2007 | Diefendorff |

FOREIGN PATENT DOCUMENTS

| | | |
|---|---|---|
| DE | 4030267 A1 | 4/1991 |
| DE | 4030287 A1 | 4/1991 |
| JP | 05-189320 A | 7/1993 |
| JP | 05-250262 A | 9/1993 |
| JP | 07-152654 A | 6/1995 |
| JP | 10228419 A | 8/1998 |
| JP | 2006-185284 A | 7/2006 |
| JP | 2007-152654 A | 6/2007 |
| WO | 2007/024937 A1 | 3/2007 |
| WO | 2007/139529 A1 | 12/2007 |

OTHER PUBLICATIONS

Combined Search and Examination Report received for United Kingdom Patent Application No. 0809264.5, mailed on Aug. 13, 2008, 5 pages.

Office Action received for German Patent Application No. 102008025476.2, mailed on Dec. 9, 2008, 3 pages of Office Action and 3 pages Of English Translation.

Final Office Action received for U.S. Appl. No. 11/757,103, mailed on Oct. 28, 2009, 14 pages.

Final Office Action received for U.S. Appl. No. 11/757,103, mailed on Oct. 5, 2010, 17 pages.

Final Office Action received for U.S. Appl. No. 11/757,103, mailed on Dec. 6, 2011, 18 pages.

Final Office Action received for U.S. Appl. No. 11/757,103, mailed on Jul. 5, 2012, 18 pages.

Final Office Action received for U.S. Appl. No. 11/757,103, mailed on Sep. 26, 2013, 20 pages.

Non-Final Office Action received for U.S. Appl. No. 11/757,103, mailed on Dec. 18, 2012, 23 pages.

Non-Final Office Action received for U.S. Appl. No. 11/757,103, mailed on Apr. 2, 2012, 19 pages.

Non-Final Office Action received for U.S. Appl. No. 11/757,103, mailed on May 24, 2011, 16 pages.

Non-Final Office Action received for U.S. Appl. No. 11/757,103, mailed on May 14, 2010, 13 pages.

Non-Final office Action received for U.S. Appl. No. 111757,103, mailed on Mar. 24, 2009, 16 pages.

Notice of Allowance received for U.S. Appl. No. 11/757,103, mailed on Apr. 3, 2014, 8 pages.

Office Action received for Chinese Patent Application No. 200810100050.1, mailed on Aug. 9, 2011, 4 pages of English Translation and 3 pages Of Chinese Office Action.

Office Action received for Chinese Patent Application No. 200810100050.1, mailed on Dec. 11, 2009, 3 pages of English Translation and 7 pages of Chinese Office Action.

Office Action received for Chinese Patent Application No. 200810100050.1, mailed on Nov. 30, 2011, 4 pages of English Translation and 3 pages Of Chinese Office Action.

Office Action received for Chinese Patent Application No. 200810100050.1, mailed on Sep. 13, 2010, 7 pages of English Translation only.

Office Action received for Japanese Patent Application 2012-003898, mailed on Sep. 10, 2013, 3 pages of English Translation and 3 pages of Office Action.

Office Action received for Japanese Patent Application No. 2012-003898, mailed on May 21, 2013, 4 pages of English Translation and 4 pages of Office Action.

Milenkovic, IBM Corporation, "Microprocessor Memory Management Units," IEEE Micro, 1990, pp. 70-85.

Doweck, Intel Corporation, "Inside Intel Core Microarchitecture," Power Point Presentation, 2006, pp. 1-35.

Doweck, Intel Corporation, "Inside Intel Core Microarchitecture and Smart Memory Access—An In-depth Look at Intel Innovations for Accelerating Execution of Memory-Related Instructions," White Paper, pp. 1-12.

Intel Corporation, "OS Independent Run-Time System Integrity Services," pp. 1-13.

Intel Corporation, Intel Technical Journal, "Intel Virtualization Technology: Hardware Support for Efficient Processor Virtualization," vol. 10, Issue 3, Aug. 20, 2006, pp. 1-14.

Intel Corporation, Intel Technical Journal, "Intel Virtualization Technologyfor Directed 110," vol. 10, Issue 3, Aug. 10, 2006, pp. 1-16.

Klaus-Dieter Thies, "80486 Systemsoftware-Entwicklung," Carl Hanser Verlag, Munich Vienna, 1992, pp. 172, 173, 194 to 203, and 264-265.

Amd, AMD64 Technology, "AMD64 Architecture Programmer's Manual," vol. 2: System Programming, Publication No. 24593, Rev. 3.11, Dec. 2005, pp. 145 to 178.

Simms, Patent Act 1977: Search Report under Section 17, Application No. GB0809264.5, Aug. 12, 2008.

Office Action from corresponding foreign application in China; Serial No. 200810100050.1, filed May 30, 2008, mailed Apr. 8, 2011, 13 pages.

Office Action from corresponding foreign application in Germany; Serial No. 102008025476.2, filed May 28, 2008, mailed Mar. 11, 2011, 6 pages.

Office Action from corresponding foreign application in Japan; Serial No. 2008135642, filed May 23, 2008, mailed May 17, 2011, 10 pages.

Notice of Allowance received for Chinese Patent Application No. 200810100050.1, mailed on Mar. 20, 2012, 2 Pages of Notice of Allowance and 2 Pages of English Translation.

Office Action received for Japanese Patent Application No. 2013-261239, mailed on Aug. 19, 2014, 3 Pages of Office Action only.

Takehiro, Inoue, "64-Bit RISC CPU Employing MIPS Architecture", Interface, Japan, CQ Publishing Co. Ltd., Aug. 1, 1998, vol. 24, No. 8, pp. 185-191.

Non-Final Office Action received for U.S Appl. No. 14/455,072, mailed on Mar. 17, 2015, 15 pages.

Office Action received for Japanese Patent Application No. 2006-135642, mailed on Sep. 13, 2006, 2 pages of English Translation and 2 pages of Japanese Office Action.

Office Action received for Chinese Patent Application No. 201210167652.5, mailed on Aug. 8, 2014, 9 pages of English Translation and 16 pages of Chinese Office Action.

Office Action received for Japanese Patent Application No. 2013-261239, mailed on Dec. 16, 2014, 6 pages of English Translation and 6 pages of Japanese Office Action.

Non-Final Office Action received for U.S. Appl. No. 14/455,147, mailed on Feb. 25, 2015, 15pages.

Office Action received for Chinese Patent Application No. 201210167652.5, mailed on Apr. 13, 2015, 5 pages of English Translation and 4 pages of Chinese Office Action.

* cited by examiner

| Physical Address 402 | P 404 | R/W 406 | U/S 408 | A 410 | D 412 | G 414 | EXB 416 | Size 418 | Fault 420 | ⋮ |

LINEAR TO PHYSICAL ADDRESS TRANSLATION WITH SUPPORT FOR PAGE ATTRIBUTES

RELATED APPLICATIONS

This is a Continuation of application Ser. No. 11/757,103, filed Jun. 1, 2007, now U.S. Pat. No. 8,799,620.

TECHNICAL FIELD

Embodiments of the invention generally relate to the field of computing systems and, more particularly, to systems, methods and apparatuses for virtual address to physical address translation with support for page attributes.

BACKGROUND

Virtual memory allows programmers to use a larger range of memory for programs and data than is provided by the actual physical memory available to a processor. In addition virtual memory allows programs to be loaded in parallel to one another with a memory map that is impassive to the presence of other programs and the location to which it is loaded. A computing system maps a program's virtual addresses (also known as a Linear Address in the IA32 architecture—in this description 'linear address' or LA is used synonymously with 'virtual address') to real hardware storage addresses (e.g., physical memory addresses) using address translation hardware. The hardware uses a tree of tables in memory as the input data for the address translation. The root of the tree is pointed to by a register that holds the physical address of the first table in the page table tree. An example of such a register is CR3 in the IA32 architecture. Page table entries (PTEs) are addressed using a base and an index. The base is taken from a register or a previous table memory pointer. The index is using a portion of the linear address. The PTE includes either the page, if the rest of the sub tree is not present in memory, or a memory pointer and other information to be discussed below. The memory pointer is for a page in memory that may either include data (that belongs to the application or the operating system) or another level of the page-table. If it is the later case, another portion of the linear address is used to index into the table in a scheme similar to what is described. If the address is for an application page, the physical address is constructed by adding the remaining bits of the address (that were not used for indexing) to the page base address that was retrieved from the page table entry. Also, some embodiments may instantiate several translation schemes (e.g., different table tree indexing structures) as described in a register, for the sake of simplifying this description we will consider such information part of the CR3 register, even though it may be kept in one or more other registers.

Beyond the address translation information, these tables include information such as access rights read, write or execute, presence of the data in memory, caching policy indications, page modified state, etc. In some cases, a page table may include pages of different sizes, where larger pages are pointed to in a lower level of the page table tree (instead of pointing to another page of pointers) The size of the page pointed to is stored as an attribute in the page table tree (typically in the level that points to the data page).

To retrieve the physical address, the page-table entries are read in a recursive manner starting from the root (CR3 in IA32) and properties of the page are retrieved and merged. The IA32 Programmers' Reference Manual (e.g., Volume 3A) provides an example of a conventional approach to retrieving physical addresses. This process requires several memory access operations and is implemented by Page-Table Handling hardware or uCode sequences.

Occasionally, software is required to retrieve the physical memory address. In such cases either an emulated full table walk or a shortened heuristic that is based on the limitations of the setup of the table that the operating system imposes are used.

A translation look aside buffer (TLB) is a cache that holds the result of previous translations such that successive accesses to an address (or a range of addresses) may avoid walking the data structure and can use the results of a previous translation. In many cases the address translation also checks for the operation to meet the conditions set for the memory location. Conventional address translation instructions typically return a physical memory address for a linear address provided as an operand without providing any additional information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for a virtual (to be referred to as linear) to physical address translation with support for page attributes. In some embodiments, a system receives an instruction to translate a linear memory pointer to a physical memory address for a memory location. The system may return the physical memory address and one or more page attributes.

Figure 1:
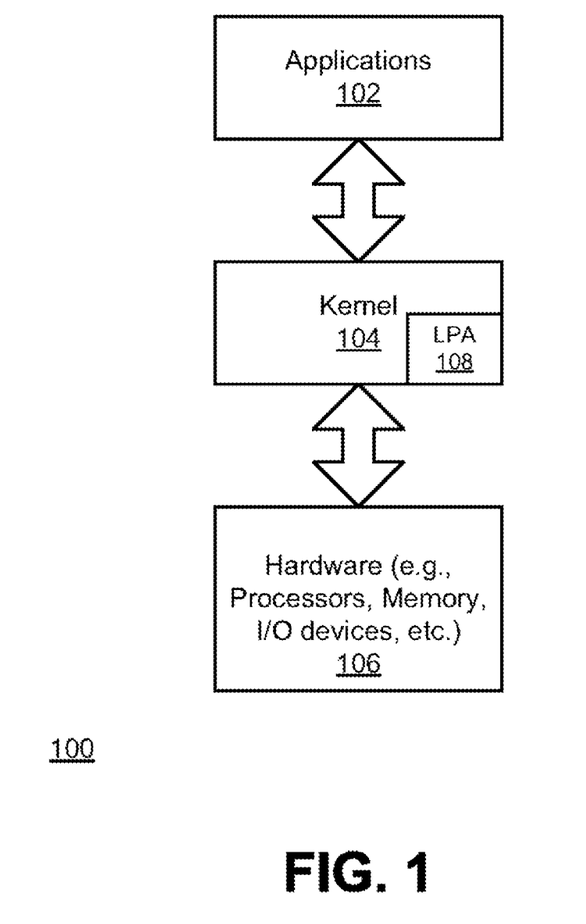
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. System 100 includes applications 102, kernel 104, and hardware 106. Kernel 104 manages hardware 106 and provides communication between applications 102 and hardware 106. To provide fault tolerance and security, kernel 104 may operate at a higher privilege level (e.g., ring 0) than applications 102. In some embodiments, kernel 104 includes LOAD PHYSICAL ADDRESS instruction (LPA) 108. The input parameters for LPA 108 may include nearly any pointer to memory. The output parameters of LPA 108 include a physical memory address (PA) corresponding to the pointer and one or more page attributes. As is further described below with reference to FIGS. 2-5, LPA 108 may support touch operations and/or virtualization technology.

Table 1 illustrates selected aspects of an LPAxx instruction according to some embodiments of the invention. In some embodiments, the LPAxx instruction takes, as an input, a linear address (e.g., m8) and outputs the physical address of that memory location as well as one or more page attributes. In 32-bit modes and in cases were the physical address may be larger than the register, the instruction may have 2 registers for the address output (to support a larger than 32-bit physical address space). In 64-bit modes, a single output register may suffice. In some embodiments, the basic structure of the instruction supports read semantics. Write semantics may be supported to directly check whether a page is write-enabled (e.g., see the trap discussion below).

TABLE 1

| Instruction | 64-Bit Mode | Compatibility/Leg Mode | Operation |
|---|---|---|---|
| LPA | Valid | Valid | Translate address and return attributes |
| LPARD 32-bit regs | Valid | Valid | Translate address, return attributes and touch as read |
| LPARD 64-bit regs | Valid | N.E. | |
| LPAWR 32-bit regs | Valid | Valid | Translate address, return attributes and touch as write |
| LPAWR 64-bit regs | Valid | N.E. | |

N.E. - instruction not encoded in this mode

In some embodiments, when operating in a legacy mode, the LPAxx instruction moves the address of the byte address in DS:(E)SI to EDX:EAX, and EBX holds the access permissions and page size. In 64-bit mode, the LPAxx may move the address of the byte address in (R|E)SI to EDX:EAX (or r64 register), and EBX holds the access permissions and page size. In alternative embodiments, different registers may be used and different modes may be supported.

In some embodiments, the LPAxx instruction is a protected instruction that is run, for example, at the kernel level. Running the instruction at the application level can lead to a violation of the user-application virtualization effect (e.g., a user application is not aware of the actual address at which it is running). In some embodiments, the LPAxx instruction operates in synchronous operating system calls in which the kernel code operates with the user context (in IA32 mode this refers to a specific CR3 value). In alternative embodiments (as is further described below), the instruction operates in asynchronous operating system (OS) calls. In some embodiments, the use of LPAxx is similar to the equivalent SW operations that are present in the operating system, to ensure that the resulting physical address is synchronized with the page table.

The input parameters may be nearly any valid way of pointing to memory. For example, an m8 value or an r/m8 value may be alternatively used to give the instruction more flexibility in specifying the linear address. The address translation hardware (e.g., system 200, shown in FIG. 2) may perform the address translation operations as if a read (or write) is required for the instruction, with a different result being returned. The address information in a translation look aside buffer (e.g., TLB 204, shown in FIG. 2) may be used directly without going through a page walk phase.

In some embodiments, the output parameter is a physical address (PA) (e.g., up to 64-bits in length) and one or more page attributes (e.g., one or more of the attributes shown in table 2). The PA may be stored in a single 64-bit register (e.g., when operating in the IA32e mode) or in an implicitly defined register pair (e.g., when operating in the IA32 mode or, optionally, in the IA32e compatible mode). The one or more page attributes may be stored in an implicitly defined register. In alternate embodiments, other means for making the data available to software for later use are used such as storing the information in a dedicated register(s) or in a memory location.

As shown in Table 1, in some embodiments, there may be two (or more) types of LPAxx instructions. For example, some embodiments may include an LPA instruction and an LPA with touch instruction. The LPA instruction, as described above, receives, as an input, a LA and returns a PA and one or more page attributes. The LPA with touch instruction also returns a PA and one or more page attributes. In addition, the LPA with touch instruction determines whether the page is present in memory (according to the status in the last level of the page table). If the last page is not present, the LPA with touch instruction produces a fault that is the same as the fault produced by a RD or a WR for LPARD and LPAWR, respectively. This allows the standard fault handlers to take care of the fault case (e.g., bring the page to memory in case of a page fault or for a write touch to convert a read only page to a write enabled). The LPA with touch instruction determines the status of a page without accessing the data in memory, which saves an access to the memory hierarchy and in many cases a cache miss. Instead, the status determination is based on the status of the page table entries (PTEs).

Figure 2:
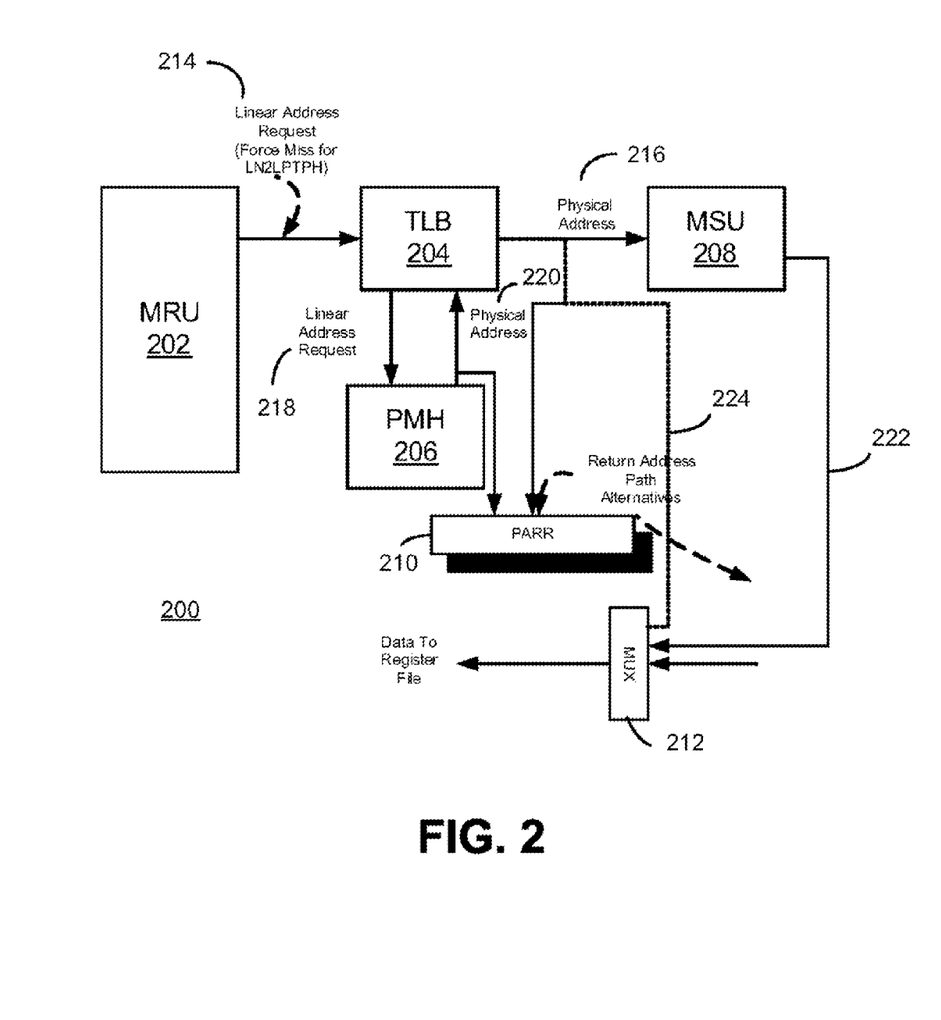
FIG. 2 is a block diagram illustrating selected aspects of address translation hardware, according to an embodiment of the invention.

FIG. 2 is a block diagram illustrating selected aspects of address translation hardware, according to an embodiment of the invention. Address translation hardware 200 includes memory request unit (MRU) 202, translation look aside buffer (TLB) 204, page miss handler (PMH) 206, memory sub system (MSU) 208, physical address return register (PARR) 210, and multiplexer (MUX) 212. In alternative embodiments, address translation hardware 200 includes more elements, fewer elements, and/or different elements.

MRU 202 issues memory requests (e.g., either a load or store) that include a linear address (e.g., linear address 214). TLB 204 is a caching mechanism (which may include multiple layers of TLBs) that holds the physical address and attributes of linear addresses that that have already been translated. Not all previously translated addresses are held in the TLB and various caching heuristics are applied to determine which addresses are kept. When the Page Tables are updated the affected entries are purged from the TLB either by direct software control (software managed TLB coherency) or by hardware (hardware managed TLB coherency). If the translation for LA 214 is found in the TLB 204 the TLB outputs the physical memory address (PA) directly. The PA (e.g., PA 216) can be used to obtain data directly from MSU 208. If TLB 204 does not include the address, then the LA is sent (218) to PMH 206. PMH 206 performs a page walk, and if the page walk is successfully completed returns the PA (220) to TLB 204. When the PMH walk fails (e.g., the data is not present in memory for any level of the page table) an exception is generated which yields to the operating system. For LPA operation in some embodiments the operation terminates with status that indicates where the fault occurred without generating an exception, more details on the returned information are provided below. The MSU 208 represents the memory hierarchy which may consist of directly accessing the memory or one or more levels of caches used to reduce memory access delays. The MSU 208 returns the data stored in Physical Address 216 via a return bus to a data registers (222).

In some embodiments, in addition to obtaining the PA (from either TLB 204 or PMH 206, depending on the case), one or more page attributes are obtained in response to the instruction. The PA and the associated page attributes are returned as part of the LPA parameters to the processor registers. In some embodiments, the PA and the associated page attributes are placed in a physical address return register (e.g., PARR 210) which is a register dedicated for the holding of the PA and/or attributes information and a status that indicates the completion of the operation. Optionally the processor may use microcode to read the data from the PARR and place it into a general purpose register. In an alternative embodiment, the PARR can be directly addressed by other processor instructions. In another alternative embodiment, the PA and associated page attributes may be returned to the processor via a read return bus (e.g., 224). In yet other embodiments, different techniques may be used to return the PA and associated page attributes to the processor.

Figure 3:
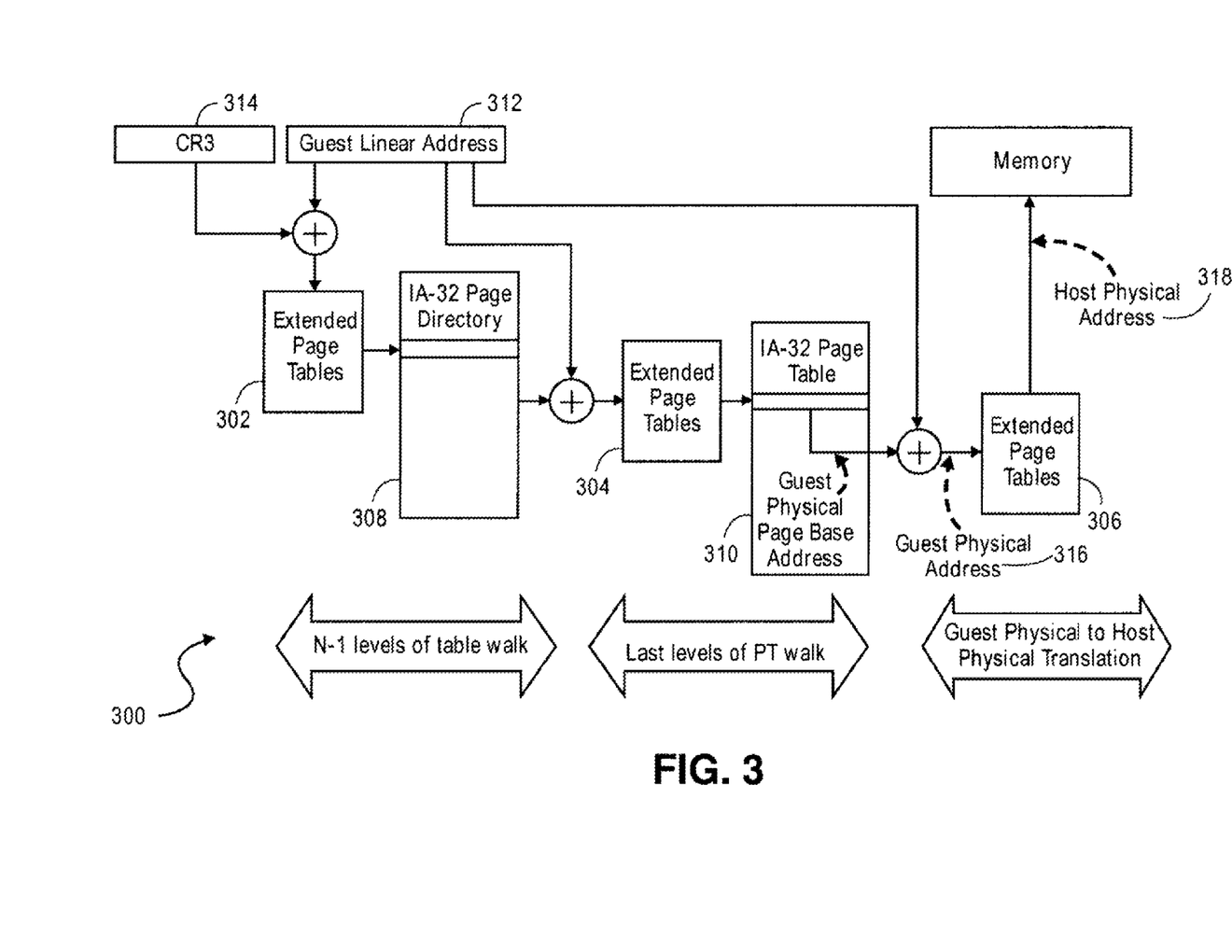
FIG. 3 is a block diagram illustrating selected aspects of a page tree having extended page tables according to an embodiment of the invention.

Table 2 provides a list of selected page attributes that may be returned, with a PA, in some embodiments of the invention. In alternative embodiments, more attributes, fewer attributes, and/or different attributes may be returned.

return the guest PA (GPA). FIG. 3 is a block diagram illustrating selected aspects of address translation in a VT environment, according to an embodiment of the invention.

Page table tree 300 includes extended page tables (EPTs) 302-306. EPTs 302-306 are similar to the conventional tables (e.g., 308 and 310), except that EPTs 302-306 belong to the host OS. The EPT uses a tree of tables pointed to by an EPT base register to translate a GPA into a HPA. This operation is performed for any GPA that requires translation including access to the guest page tables as part of the guest page table walk. A portion of guest LA (GLA) 312 and the CR3 (314) reference a location in EPT 302. EPT 302, in turn, points to a location in page directory 308. Page directory 308 and another portion of GLA 312 may be used to reference a location in EPT 304. This process may be continued for nearly any number of levels until GPA 316 is reached. EPT 306 maps GPA 316 to HPA 318. In some embodiments, when operating in a VT environment, the LPAxx instruction returns the GPA of the page itself as stored in the last guest page table (e.g., GPA 316) and one or more associated page attributes.

In some embodiments the TLB holds only the HPA, which requires the page table to be walked for returning the GPA, as

TABLE 2

| Page Attribute | Brief Description |
| --- | --- |
| Present bit (P-bit) | Indicates whether the page is present in memory. |
| Read/Write bit (R/W bit) | Indicates whether a page is read-only or if read/write access is possible. |
| User/Supervisor bit (U/S bit) | Indicates a protection level for the page. |
| Access bit (A bit) | Indicates whether the page has been accessed. |
| Dirty bit (D bit) | Indicates whether the page has been modified. |
| Global flag (G bit) | Indicates that the page is used globally (Global flag). |
| Execute disable bit (EXB bit) | Indicates that the page is a data page and code cannot be executed from it. |
| Page size | Indicates the size of the page according to the page table structure. For example, the size of the page may be 4 KB, 2 MB, 4 MB, etc. |
| Translation page fault | Indicates that a page fault occurred during the process of address translation while accessing one of the page tables. The value indicates the level of the page table from the root (e.g., as pointed to by the CR3 register or any other suitable register). The presence of the page itself is indicated by the P-bit. When the page translation is stored in the TLB, the page-table tree presence checking may be waved. |

For most cases, the exceptions are handled in substantially the same way as they are for a normal memory access (read or write). In some embodiments, however, the following exceptions apply. If the LPAxx fails to access a data page, the instruction returns an address that is equal to zero and the P-bit is cleared. If the address translation fails to access any of the page tables, the "Translation Page Fault" status is set to indicate the fault and the level of the fault. Regarding the LPAxx with touch instruction, the page fault is taken if the access to the page fails (e.g., generating a page fault exception). In some embodiments, the exception is not taken if the failure is on any of the page tables' access which is flagged using the "translation Page Fault" status.

In some embodiments, the LPAxx instruction supports virtualization technology (VT) with enhanced page table (EPT). When operating in a VT environment, the translation of an address may depend, in part, on whether the requestor is a guest OS or the host OS (or virtual machine manager—VMM), as indicated by status bits within the processor. In some embodiments, if the requestor is the host OS, then the LPAxx instruction returns the host PA (HPA). If, however, the requestor is the guest OS, then the LPAxx instruction may done for the case of a TLB miss. In alternate embodiments, the TLB includes an additional field that holds the GPA and attributes of the page which enables retrieving the GPA from the TLB.

Figure 4:
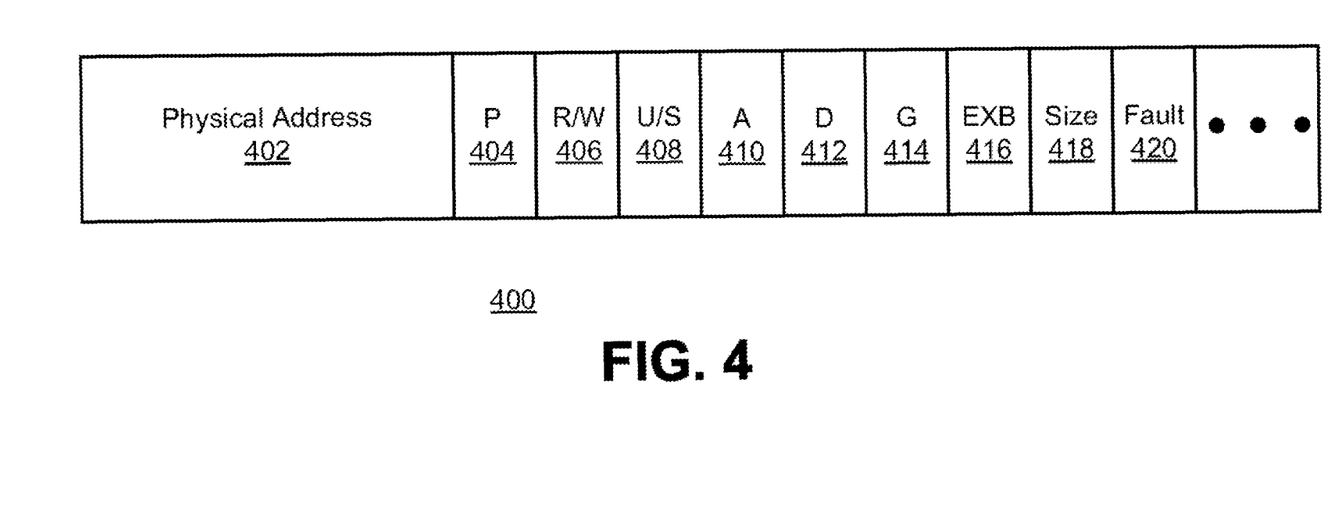
FIG. 4 is a block diagram illustrating selected aspects of a page table entry according to an embodiment of the invention.

FIG. 4 is a block diagram illustrating selected aspects of a page table entry (PTE) according to an embodiment of the invention. In some embodiments, the output parameters of an LPAxx instruction are obtained from a PTE (e.g., PTE 400) or a similar entry in a TLB (e.g., TLB 204). For example, the PA address may be obtained from field 402 and the associated page attributes may be obtained from fields 404-420. The page attributes shown in fields 404-420 are discussed above in Table 2. In alternative embodiments, PTE 400 may include more fields, fewer fields, and/or different fields.

Figure 5:
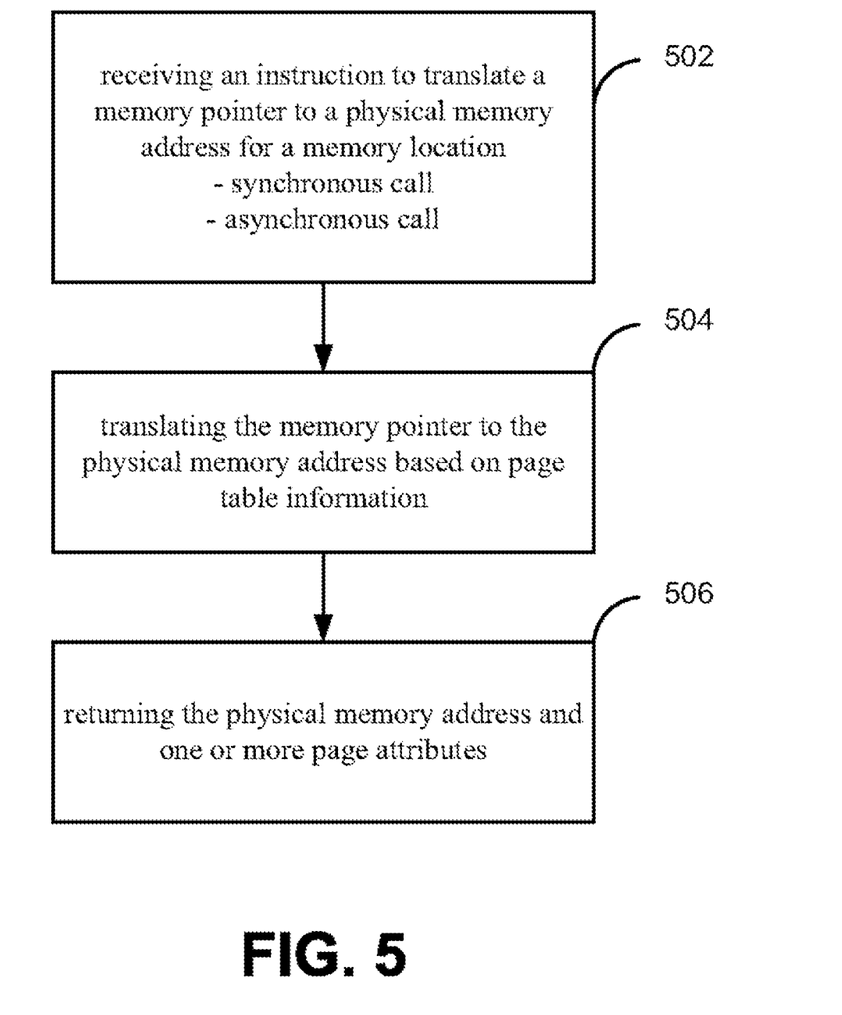
FIG. 5 is a flow diagram illustrating selected aspects of a method for linear to physical address translation with support for page attributes according to an embodiment of the invention.

FIG. 5 is a flow diagram illustrating selected aspects of a method for linear to physical address translation with support for page attributes according to an embodiment of the invention. Referring to process block 502, address translation logic (e.g., address translation logic 200, shown in FIG. 2) receives an instruction (e.g., an LPAxx instruction) to translate a memory pointer (e.g., a LA) to a PA. The address translation logic translates the memory pointer to a PA without performing a memory access. Instead, the output parameters are obtained either from TLB entries or from PTEs. Referring to process block 506, the PA and one or more associated page attributes are returned to the processor (e.g., by placing the data in a PARR or returning the data via a read return bus). The phrase "without performing a memory access" refers to relying on page table information to perform the translation. The page table information may be provided by a page table entry (e.g., in the TLB) or from memory.

In some embodiments, the LPAxx instruction supports asynchronous calls in addition to synchronous calls. An asynchronous call refers to a call to the LPAxx instruction from an application that does not correspond to the current CR3 that is being used for translation. In some embodiments, the LPAxx instruction includes additional parameters that tell the page tree where to start the page table walk (e.g., a CR3 value corresponding to the application that made the asynchronous call). In many cases, the data in the TLB cannot be used during the asynchronous call since that data corresponds to a different program. Thus, in many cases, a page table walk is executed to obtain the PA and the one or more associated page attributes. In other cases, tags are provided to identify with which address space (CR3) a TLB entry is associated. This may enable usage of TLB entrees in asynchronous calls.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A processor comprising:
   a plurality of registers;
   at least one translation look aside buffer, wherein the at least one translation look aside buffer is to include a plurality of entries, wherein at least one entry is to include a physical address and a plurality of attributes associated with the physical address;
   a page miss handler to perform a table walk; and
   a physical address return register, wherein the physical address return register is a 64-bit register,
   wherein the processor is to receive an instruction to translate a virtual address to a first physical address, wherein the instruction is a kernel level privileged instruction, and
   wherein the instruction is to cause the processor, when in a 64-bit mode, to:
      translate the virtual address to the first physical address;
      store the first physical address translated from the virtual address in the physical address return register; and
      store at least one attribute associated with the first physical address translated from the virtual address in the physical address return register.

2. The processor of claim 1, wherein the at least one attribute comprises an indication of whether a fault occurred during the translation of the virtual address to the first physical address.

3. The processor of claim 1, wherein the at least one attribute comprises a caching policy indication.

4. The processor of claim 1, wherein the at least one attribute comprises a protection level.

5. The processor of claim 1, wherein the instruction is to cause the processor to translate the virtual address to the first physical address as if a write is performed for the instruction.

6. The processor of claim 1, wherein the physical address return register is a register dedicated to storing physical addresses and associated attributes.

7. The processor of claim 1, wherein the instruction is to operate at a higher privilege level than an application.

8. The processor of claim 1, wherein the instruction is to cause the processor to translate the virtual address to the first physical address without accessing data at the first physical address in a memory hierarchy.

9. A processor comprising:
   a plurality of registers;
   at least one translation look aside buffer, wherein the at least one translation look aside buffer is to include a plurality of entries, wherein at least one entry is to include a physical address and a plurality of attributes associated with the physical address;
   a page miss handler to perform a table walk; and
   a physical address return register, wherein the physical address return register is a 64-bit register,
   wherein the processor is to receive an instruction to translate a virtual address to a first physical address, wherein the instruction is a kernel level privileged instruction, and
   wherein the instruction is to cause the processor, when in a 64-bit mode, to:
      start to translate the virtual address to the first physical address;
      store an indication that a fault occurred in the physical address return register; and
      store a level at which the fault occurred in the physical address return register.

10. The processor of claim 9, wherein the instruction is to cause the processor not to take an exception when the fault occurred.

11. The processor of claim 9, wherein the physical address return register is a register dedicated to storing a physical address translated from a virtual address.

12. The processor of claim 9, wherein the instruction is to cause the processor to start to translate the virtual address to the first physical address as if a write is to be performed for the instruction.

13. The processor of claim 9, wherein the instruction is to operate at a higher privilege level than applications.

* * * * *